US012792267B2

(12) United States Patent
Kim et al.

(10) Patent No.: US 12,792,267 B2
(45) Date of Patent: Nov. 10, 2026

(54) STORAGE DEVICE FOR STORING DATA AND METHOD OF OPERATING THE SAME

(71) Applicant: SK hynix Inc., Icheon-si (KR)

(72) Inventors: Jung Ae Kim, Icheon-si (KR); Tae Ha Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/680,307

(22) Filed: May 31, 2024

(65) Prior Publication Data

US 2025/0199721 A1 Jun. 19, 2025

(30) Foreign Application Priority Data

Dec. 19, 2023 (KR) ........................ 10-2023-0186052

(51) Int. Cl.
*G06F 12/00* (2006.01)
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ............................. G06F 3/0613; G06F 3/0659
USPC .......................................................... 711/154
See application file for complete search history.

(56) References Cited

U.S. PATENT DOCUMENTS 6,768,704 B1 * 7/2004 Kawaguchi .......... G04D 7/1264 368/203
9,431,117 B2 * 8/2016 Jung .................. G06F 11/1068
9,672,104 B2 * 6/2017 Jung ...................... G11C 29/52
2012/0224425 A1 * 9/2012 Fai ...................... G11C 11/5642 365/185.09
2014/0101372 A1 * 4/2014 Jung .................. G06F 11/1068 711/103
2016/0117105 A1 * 4/2016 Thangaraj ............ G06F 3/0604 711/103
2017/0194040 A1 * 7/2017 Yoneya ............... G06F 11/3058
2020/0057581 A1 * 2/2020 Choi ..................... G06F 3/0659
2021/0117338 A1 * 4/2021 Bueb ..................... G06F 12/126
2022/0004341 A1 * 1/2022 Chen ....................... G06F 3/061
2022/0075562 A1 * 3/2022 Kurosawa ........... G06F 11/1048
2024/0176700 A1 * 5/2024 Seo ..................... G06F 11/1068

FOREIGN PATENT DOCUMENTS

KR 20210003633 A 1/2021
KR 20210078548 A 6/2021
KR 20220003135 A 1/2022

* cited by examiner

*Primary Examiner* — Mohamed M Gebril
(74) *Attorney, Agent, or Firm* — Ashurst Perkins Coie US LLP

(57) ABSTRACT

Provided herein may be a storage device and a method of operating the same. The storage device may include a memory device including a plurality of memory blocks, each including a plurality of memory cells configured to store data, and a memory controller in communication with the memory device and configured to 1) determine a write mode of a memory block of the memory device to be either a first write mode in which one data bit is stored in a memory cell of a memory block or a second write mode in which a plurality of data bits is stored in a memory cell based on a temperature of the storage device and a number of read reclaim operations that have been performed in the memory block and 2) control the memory device to perform a write operation in the determined write mode.

17 Claims, 8 Drawing Sheets

STORAGE DEVICE FOR STORING DATA AND METHOD OF OPERATING THE SAME

PRIORITY CLAIM AND CROSS-REFERENCE TO RELATED APPLICATION

This patent document claims priority under 35 U.S.C. § 119(a) to Korean patent application number 10-2023-0186052 filed on Dec. 19, 2023, in the Korean Intellectual Property Office, the entire disclosure of which is incorporated by reference herein.

TECHNICAL FIELD

Various embodiments of the present disclosure generally relate to a semiconductor device, and more particularly to a storage device for storing data and a method of operating the storage device.

BACKGROUND

A storage device may be a device which stores data under the control of a host, such as a mobile phone, a smartphone, an MP3 player, a laptop computer, a server computer, a desktop computer, a game console, a television (TV), a tablet PC, an automobile, an in-vehicle infotainment system, or any of various types of electronic devices. Such a storage device may include a memory device in which data is stored and a memory controller which controls the memory device.

SUMMARY

Various embodiments of the present disclosure are directed to a storage device having improved reliability and a method of operating the storage device.

An embodiment of the present disclosure may provide for a storage device. The storage device may include a memory device including a plurality of memory blocks, each including a plurality of memory cells configured to store data, and a memory controller in communication with the memory device and configured to 1) determine a write mode of a memory block of the memory device to be either a first write mode in which one data bit is stored in a memory cell of a memory block or a second write mode in which a plurality of data bits is stored in a memory cell based on a temperature of the storage device and a number of read reclaim operations that have been performed in the memory block and 2) control the memory device to perform a write operation in the determined write mode.

An embodiment of the present disclosure may provide for a method of operating a storage device, the storage device including a memory device and a memory controller, wherein the memory device includes a plurality of memory blocks, each including a plurality of memory cells configured to store data, and the memory controller is in communication with the memory device and configured to control the memory device. The method may include measuring a temperature of the storage device, and obtaining a number of read reclaim operations, selecting a write mode of a memory block to be either a first write mode in which one data bit is stored in a memory cell of the memory block or a second write mode in which a plurality of data bits is stored in the memory cell based on the temperature and the number of read reclaim operations, and performing a write operation in the selected write mode.

DETAILED DESCRIPTION

Specific structural or functional descriptions in the embodiments of the present disclosure introduced in this specification or application are provided to describe embodiments as the examples of the disclosed technology. Various embodiments of the present disclosure may be practiced in various forms, and should not be construed as being limited to the embodiments described in the specification or application.

Figure 1:
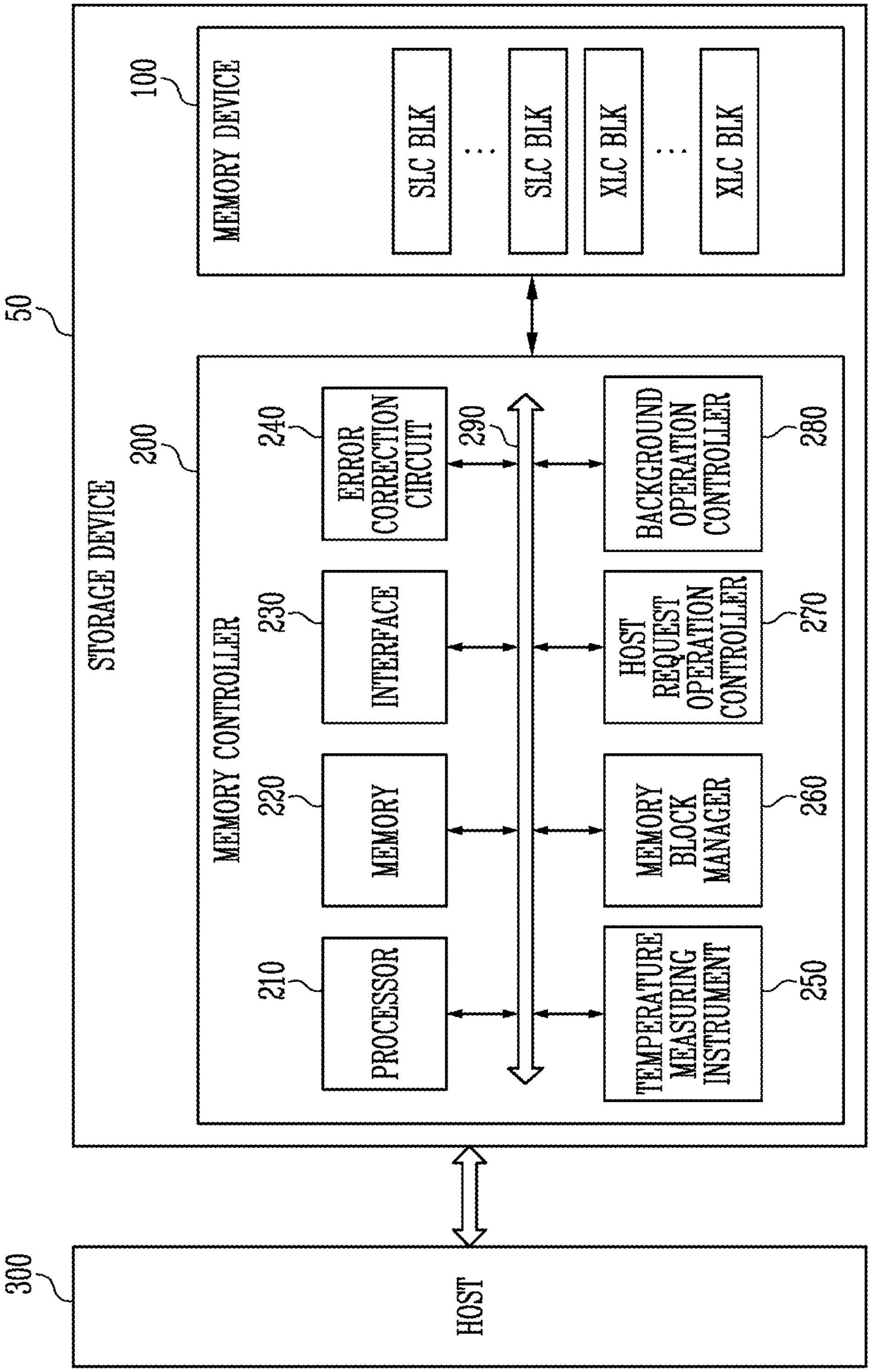
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include a memory device 100 and a memory controller 200 which controls the operation of the memory device 100.

The storage device 50 may be implemented as any one of storage devices such as a solid state drive (SSD), an MMC or eMMC type-multimedia card, a universal serial bus (USB) storage device, a universal flash storage (UFS) device, a peripheral component interconnection (PCI) or PCI express (PCI-E) card-type storage device, a compact flash (CF) card, a smart media card, and a memory stick, depending on a method for communication with a host 300.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may include a plurality of memory blocks which store data. Each memory block may include a plurality of memory cells.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits. The single-level cell may have a threshold voltage corresponding to any one of an erase state and one program state depending on a write operation. Each of the multi-level cell, the triple-level cell, and the quad-level cell may have a threshold voltage corresponding to any one of the erase state and a plurality of program states depending on the write operation.

In an embodiment, the plurality of memory blocks may include a plurality of single memory blocks SLC BLK and a plurality of multi-memory blocks XLC BLK. For example, the plurality of memory blocks may include memory blocks operating as single memory blocks SLC BLK and memory blocks operating as multi-memory blocks XLC BLK based on preset policies. Here, each single memory block SLC BLK may be a memory block including a plurality of memory cells implemented as single-level cells. Each multi-memory block XLC BLK may be a memory block including a plurality of memory cells, each of which stores a plurality of data bits, such as a multi-level cell, a triple-level cell, or a quad-level cell.

In an embodiment, each of the plurality of memory blocks may store one data bit or a plurality of data bits in a memory cell regardless of preset policies. For example, the memory device 100 may control each memory block so that one data bit is stored in each of memory cells included in the corresponding memory block by controlling the threshold voltages of the memory cells, thus enabling the corresponding memory block to operate as a single memory block SLC BLK. In some implementations, the memory device 100 may control each memory block so that a plurality of data bits are stored in each of memory cells included in the corresponding memory block by controlling the threshold voltages of the memory cells, thus enabling the corresponding memory block to operate as a multi-memory block XLC BLK.

In an embodiment, the memory device 100 may be a nonvolatile memory in which data is retained even when power is interrupted. In the present specification, for convenience of description, description will be made on the assumption that the memory device 100 is a NAND flash memory. Those skilled in the art would understand that the description can be applied to the various memory devices without being limited to the NAND flash memory.

In an embodiment, the memory device 100 may receive a command and an address from the memory controller 200. The memory device 100 may perform an operation indicated by the command on an area selected by the address. For example, the memory device 100 may perform a write operation (or a program operation), a read operation, and an erase operation.

The memory controller 200 may control the overall operation of the storage device 50. In the storage device, the reliability of stored data may decrease depending on the change in the internal temperature. For example, when the internal temperature changes from room temperature to high temperature or low temperature, many error bits may be contained in data read from the memory device. In this case, a read reclaim operation for reliability preservation may frequently occur, and the performance of the storage device may also be deteriorated due to the frequent read reclaim operation. Therefore, in order to prevent deteriorating of the storage device and ensure a proper operation even with a wide temperature range of the storage device, the memory controller 200 is provided to incorporate a scheme capable of improving the reliability of the storage device in response to various temperature changes.

In an embodiment, the memory controller 200 may include a processor 210, a memory 220, an interface 230, an error correction circuit 240, a temperature measuring instrument 250, a memory block manager 260, a host request operation controller 270, and a background operation controller 280. The processor 210, the memory 220, the interface 230, the error correction circuit 240, the temperature measuring instrument 250, the memory block manager 260, the host request operation controller 270, and the background operation controller 280 may communicate with each other through a communication bus 290.

The processor 210 may execute firmware, code or one or more instructions, which include various types of information required for the operation of the memory controller 200.

When power is applied to the storage device 50, the processor 210 may run the firmware (FW). When the memory device 100 is a flash memory device, the firmware (FW) may include a host interface layer (HIL) which controls communication with the host 300, a flash translation layer (FTL) which controls communication between the host 300 and the memory device 100, and a flash interface layer (FIL) which controls communication with the memory device 100.

In an embodiment, the processor 210 may receive data and a logical block address (LBA) from the host 300, and may translate the logical block address (LBA) into a physical block address (PBA) indicating the address of memory cells which are included in the memory device 100 and in which data is to be stored. In the present specification, a logical block address and a "logical address" may be used interchangeably with each other. In the present specification, a physical block address and a "physical address" may be used interchangeably with each other.

The memory 220 may be used as a buffer memory, a cache memory, a working memory, or the like.

Further, the memory 220 may store firmware, code or one or more instructions including various types of information required for the operation of the memory controller 200.

The interface 230 may include a host interface for communicating with the host 300 and a memory interface for communicating with the memory device 100.

The error correction circuit 240 may perform error correction. The error correction circuit 240 may perform error correcting code (ECC) encoding on data to be written to the memory device 100 through the interface 230. The encoded data may be transferred to the memory device 100 through the interface 230. The error correction circuit 240 may perform error correcting code (ECC) decoding on data received from the memory device 100 through the interface 230.

In an embodiment, the error correction circuit 240 may obtain the number of error bits in read data that is read from the memory device. For example, the error correction circuit 240 may obtain the number of error bits by calculating the number of error-corrected bits in the read data while error correction is performed. The error correction circuit 240 may provide information about the number or error bits to the memory block manager 260 and the background operation controller 280.

The temperature measuring instrument 250 may measure internal temperature that is the temperature of the storage device 50.

In an embodiment, the temperature measuring instrument 250 may determine a change in the temperature of the storage device 50 during a preset period. The temperature measuring instrument 250 may provide information about the measured temperature or temperature change to the memory block manager 260.

The memory block manager 260 may manage the plurality of memory blocks included in the memory device as groups. For example, the memory block manager 260 may generate a super block composed of at least two memory blocks among the plurality of memory blocks. The memory block manager 260 may manage the plurality of memory blocks on a super block basis.

In an embodiment, the memory block manager 260 may determine a write mode to be used in a write operation among a plurality of write modes. The plurality of write modes may be distinguished depending on the number of data bits stored in each of the plurality of memory cells. In an example, a first write mode may be a scheme for storing one data bit in each of the plurality of memory cells. When operating the memory blocks in the first write mode, the memory device 100 may control each memory block so that data is stored using a single memory block SLC BLK determined based on preset policies or so that one data bit is stored in each of memory cells included in the memory block regardless of the preset policies by controlling the corresponding memory block to operate as a single memory block. In an example, a second write mode may be a scheme for storing a plurality of data bits in each of the plurality of memory cells. When operating the memory blocks in the second write mode, the memory device 100 may control each memory block so that data is stored using a multi-memory block XLC BLK determined based on preset policies or so that a plurality of data bits are stored in each of memory cells included in the memory block regardless of the preset policies by controlling the corresponding memory block to operate as a multi-memory block.

In an embodiment, the memory block manager 260 may determine a write mode to be used for a write operation based on the temperature of the storage device 50 and the number of read reclaim operations (i.e., read reclaim operation count) indicating the number of times that the read reclaim operation is performed. In the example, the number of the read reclaim operations may be counted for each memory block. The read reclaim operation refers to a process that migrates data from a deteriorating memory block to another memory block when the count of read operations of the deteriorated block exceeds a preset threshold. In an example, when it is determined, based on the temperature and the number of read reclaim operations, that the reliability of the memory device 100 decreases, the memory block manager 260 may determine the write operation to be performed in the first write mode. In an example, when it is determined, based on the temperature and the number of read reclaim operations, that the reliability of the memory device 100 is not low, the memory block manager 260 may determine that the memory device 100 is in stable status. In this case, the memory block manager 260 may determine the write operation to be performed in the second write mode. Thus, in the implementations, the write operations are performed in different modes, e.g., the first write mode or the second write mode, based on the temperature of the storage device 50 and the number of read reclaim operations.

The host request operation controller 270 may control an operation requested by the host 300.

In an embodiment, the memory controller 200 may provide a command, an address, or data corresponding to a program operation, a read operation or an erase operation to the memory device 100 so that the corresponding operation is performed in response to the request of the host 300.

In an embodiment, the host request operation controller 270 may control the memory device 100 to perform a write operation depending on the write mode determined by the memory block manager 260. For example, when a request for a write operation is received from the host 300, the host request operation controller 270 may control the memory device 100 to store write data corresponding to the request depending on the determined write mode.

The background operation controller 280 may control a background operation that is performed independently of the request of the host 300. A background operation may refer to an operation performed within the memory device 100 without an intervention of a host by sending a command to the memory device from the memory controller and without receiving and executing one or more commands from the host. Some examples of such a background operation include coping and processing data stored in one part of the memory device to another part, e.g., a wear leveling, a read reclaiming, and/or a garbage collection.

In an embodiment, the background operation controller 280 may generate a command, an address, and data indicating the background operation, and may transmit them to the memory device 100. For example, the background operation controller 280 may provide the memory device 100 with commands, addresses, and data which are required for performing write operations, read operations, and erase operations associated with a performance of background operations such as a wear leveling operation, a read reclaim operation, and/or a garbage collection operation.

In an embodiment, the background operation controller 280 may determine whether a read reclaim operation is to be performed based on the number of error bits. For example, when the number of error bits in read data exceeds a level correctable by the error correction circuit 240, a read fail may occur. Therefore, the background operation controller 280 may perform the read reclaim operation when the number of error bits reaches a specific number. The specific number may be predetermined and can be varied.

In an embodiment, the background operation controller 280 may perform the garbage collection operation depending on the write mode determined by the memory block manager 260. For example, the garbage collection operation may include a read operation of reading valid data from a victim memory block, a write operation of storing the read valid data in a new memory block, and an erase operation of erasing the data stored in the victim memory block. Here, the background operation controller 280 may control the memory device 100 to store the valid data depending on the determined write mode during the write operation included in garbage collection.

When it is determined, based on the temperature and the number of read reclaim operations, that the memory device 100 is in stable status after the write operation is performed in the first write mode, the background operation controller 280 may perform a data migration operation of migrating data stored in the first memory block operating in the first write mode to a memory block operating in the second write mode. The background operation controller 280 may perform the data migration operation during an idle period of the memory device 100. Here, the idle period may indicate a state in which a separate operation is not performed because a request is not received from the host 300 or a background operation is not triggered. Furthermore, the background operation controller 280 may perform the data migration operation at a preset time, such as dawn time, based on a real time clock (RTC) received from the host 300, or while the battery or the like of the host 300 is being charged.

Figure 2A:
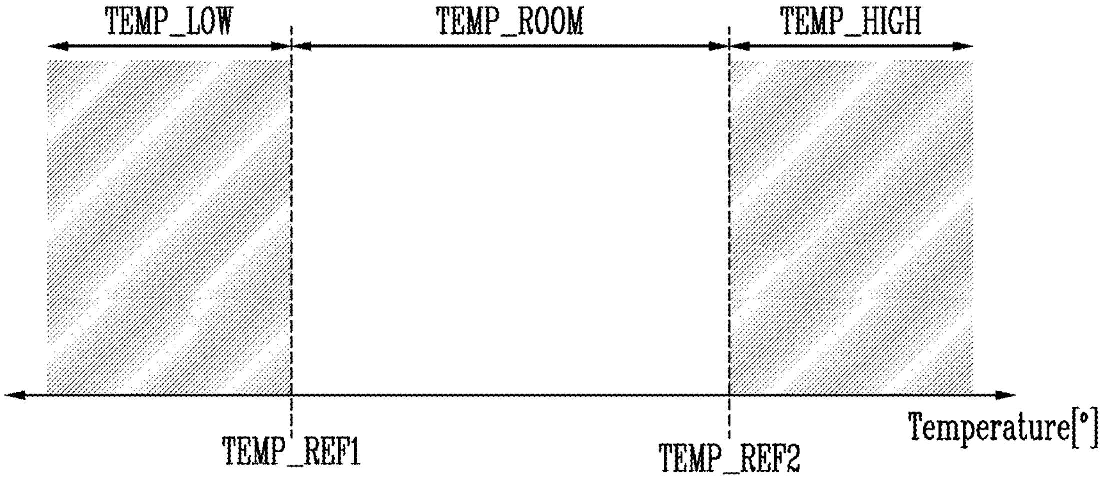
FIGS. 2A and 2B are diagrams illustrating a write mode determination condition based on temperature of a storage device according to an embodiment of the present disclosure.
Figure 2B:
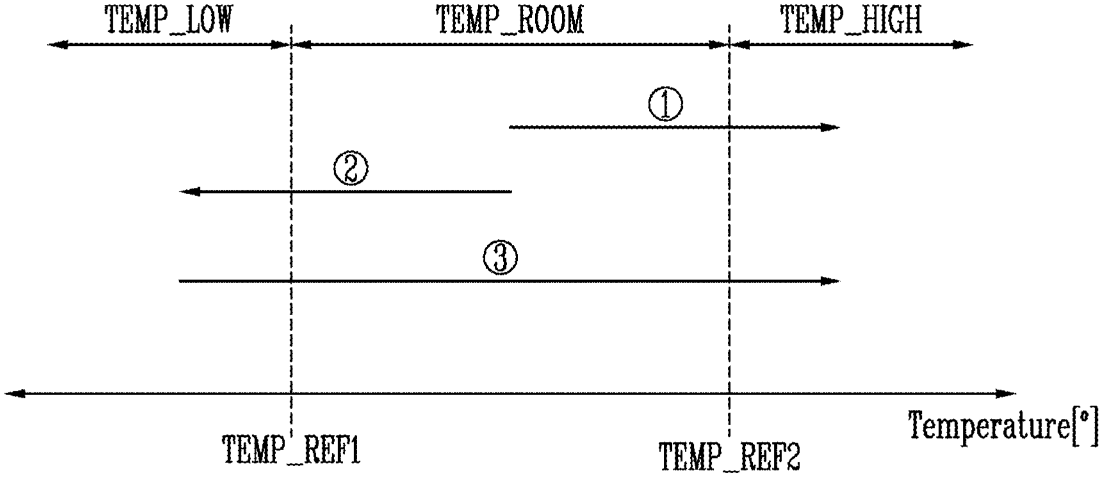

FIGS. 2A and 2B are diagrams illustrating a write mode determination condition based on a temperature of a storage device according to an embodiment of the present disclosure. As discussed above, in the implementations, the write operations are performed in different modes based on the temperature of the storage device and the number of read reclaim operations. FIGS. 2A and 2B illustrate the examples to determine whether a first condition based on the temperature of the storage device is satisfied. In an embodiment, the memory block manager 260 may determine whether the first condition based on the temperature of the storage device is satisfied in order to determine a write mode. FIGS. 2A and 2B illustrate different embodiments of determining whether the first condition is satisfied.

Referring to FIG. 2A, when internal temperature is lower than first reference temperature TEMP_REF1 corresponding to low temperature TEMP_LOW or higher than second reference temperature TEMP_REF2 corresponding to high temperature TEMP_HIGH, the memory block manager 260 may determine that the first condition is satisfied.

For example, the lower temperature TEMP_LOW may indicate temperature lower than the first reference temperature TEMP_REF1. Room temperature TEMP_ROOM may indicate temperature higher than the first reference temperature TEMP_REF1 or lower than the second reference temperature TEMP_REF2. The high temperature TEMP_HIGH may indicate temperature higher than the second reference temperature TEMP_REF2. When the internal temperature corresponds to the room temperature TEMP_ROOM, the first condition may not be satisfied. In contrast, when the internal temperature is the low temperature TEMP_LOW or the high temperature TEMP_HIGH, as in a shaded area illustrated in FIG. 2A, the first condition may be satisfied.

Referring to FIG. 2B, the memory block manager 260 may determine that the first condition is satisfied when a change in the internal temperature is greater than a reference value during a preset period.

For example, the internal temperature may change from the room temperature to the high temperature (①), change from the room temperature to the low temperature (②), or change from the low temperature to the high temperature (③) depending on the situation. The first condition may be satisfied when a current situation corresponds to any one of the above-described situations. Therefore, when the change in the internal temperature is greater than the reference value during a preset period, the memory block manager 260 may determine that the current situation corresponds to each of the above-described situations.

Figure 3:
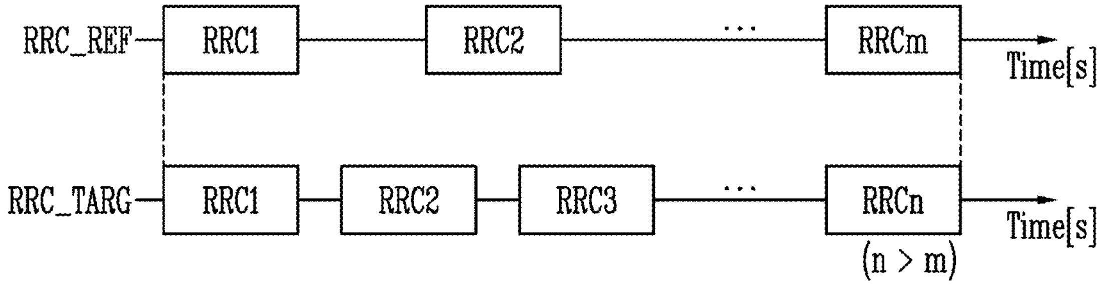
FIG. 3 is a diagram illustrating a write mode determination condition based on the number of read reclaim operations according to an embodiment of the present disclosure.

FIG. 3 is a diagram illustrating a write mode determination condition based on the number of read reclaim operations according to an embodiment of the present disclosure. FIG. 3 illustrates the example to determine whether a second condition based on the number of read claim operations is satisfied. In an embodiment, the memory block manager 260 may determine whether the second condition based on the number of read reclaim operations (i.e., read reclaim operation count) is satisfied in order to determine a write mode.

Referring to FIG. 3, the background operation controller 280 may check the cycle of a read reclaim operation based on the number of read reclaim operations. The background operation controller 280 may determine that the second condition is satisfied when a cycle during which the read reclaim operation is performed is shorter than a reference cycle RRC_REF.

For example, the reference period RRC_REF for the read reclaim operation may indicate a cycle during which M read reclaim operations RRC1 to RRCm are performed during a preset period (M is a natural number).

In an embodiment, when the background operation controller 280 performs N read reclaim operations RRC1 to RRCn, N being greater than M during the preset period, a current performance cycle RRC_TARG for the read reclaim operation may be shorter than the reference cycle RRC_REF. In this case, the memory block manager 260 may determine that the second condition is satisfied.

In an embodiment, when it is determined that the first condition and the second condition, described above with reference to FIGS. 2A, 2B, and 3, are satisfied, the memory controller 200 may control the memory device 100 to perform a write operation in the first write mode. An example of performing the write operation in the first write mode will be described later in detail with reference to FIGS. 4 and 5.

In an embodiment, when at least one of the first condition and the second condition, described above with reference to FIGS. 2A, 2B, and 3, is not satisfied, the memory controller 200 may control the memory device 100 to perform a write operation in the second write mode. For example, when the internal temperature is higher than the first reference temperature TEMP_REF1 and lower than the second reference temperature TEMP_REF2, the memory controller 200 may control the memory device 100 to perform the write operation in the second write mode. For example, when the change in internal temperature is less than or equal to the reference value during a preset period, the memory controller 200 may control the memory device 100 to perform the write operation in the second write mode. For example, when the performance cycle of the read reclaim operation is equal to or longer than the reference cycle RRC_REF, the memory controller 200 may control the memory device 100 to perform the write operation in the second write mode.

A scheme for determining whether the second condition is satisfied is not limited to the scheme illustrated in FIG. 3. For example, the memory block manager 260 may determine whether the second condition is satisfied, based on various schemes that are capable of determining whether the reliability of the memory device 100 is low. For example, the memory block manager 260 may determine that the second condition is satisfied when the number of error bits is greater than the reference number of error bits, based on the result of comparing the number of error bits with the reference number of error bits.

Figure 4:
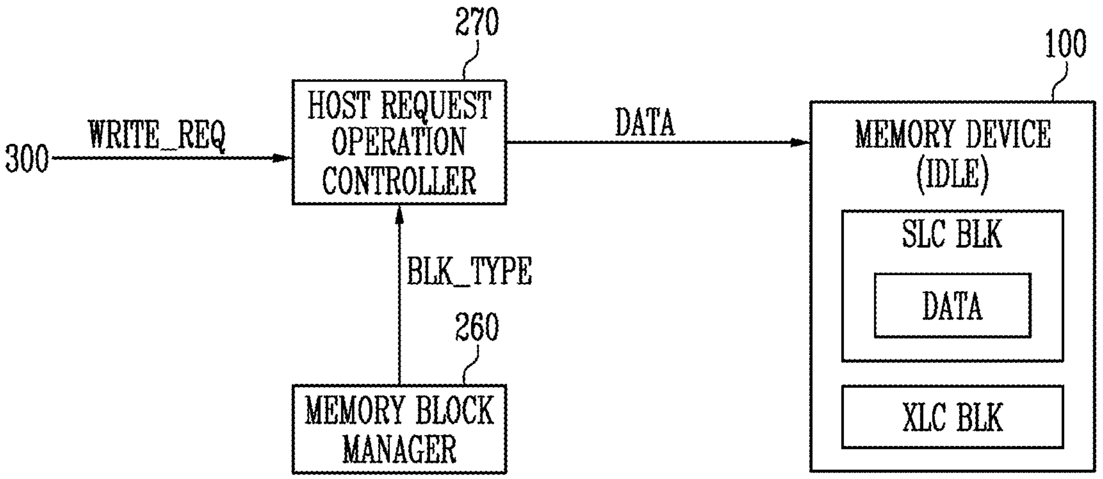
FIG. 4 is a diagram illustrating an example of performing a write operation in response to a write request from a host according to an embodiment of the present disclosure.

FIG. 4 is a diagram illustrating an example of performing a write operation in response to a write request from a host according to an embodiment of the present disclosure. FIG. 4 illustrates an example of performing a write operation in response to the request of the host 300 when a first condition and a second condition are satisfied.

In an embodiment, when internal temperature of the storage device is lower than first reference temperature corresponding to low temperature or higher than second reference temperature corresponding to high temperature and when a performance cycle of a read reclaim operation is shorter than a reference cycle, the memory controller 200 may control the memory device 100 to perform a write operation in the first write mode. In another example, when the change in internal temperature of the storage device is greater than the reference value during the preset period and the performance cycle of the read reclaim operation is shorter than the reference cycle, the memory controller 200 may control the memory device 100 to perform the write operation in the first write mode.

Referring to FIG. 4, when a request for write operation WRITE_REQ is received from the host 300, the memory controller 200 may control the memory device 100 to store write data DATA corresponding to the request WRITE_REQ in the first write mode.

For example, the host request operation controller 270 may receive the write request WRITE_REQ from the host 300. Here, because the first and second conditions are satisfied, the memory block manager 260 may select the first write mode, and may provide information about a memory block type BLK_TYPE to be used in a write operation determined based on the first write mode to the host request operation controller 270. For example, the information about the memory block type BLK_TYPE may include information indicating a single memory block SLC BLK determined based on the first write mode.

In an embodiment, the host request operation controller 270 may provide the memory device 100 with a write command, an address indicating a single memory block SLC BLK in which write data DATA is to be stored, and the write data DATA, based on the information about the memory block type BLK_TYPE. Further, the host request operation controller 270 may provide the memory device 100 with a write command, an address indicating a memory block in which write data DATA is to be stored, a signal for controlling the corresponding memory block to operate as a single memory block SLC BLK, and the write data DATA, based on the information about the memory block type BLK_TYPE.

The memory device 100 may store the write data DATA in in the single memory block SLC BLK indicated by the address in response to the write command or store one data bit in each of memory cells included in the memory block indicated by the address.

Figure 5:
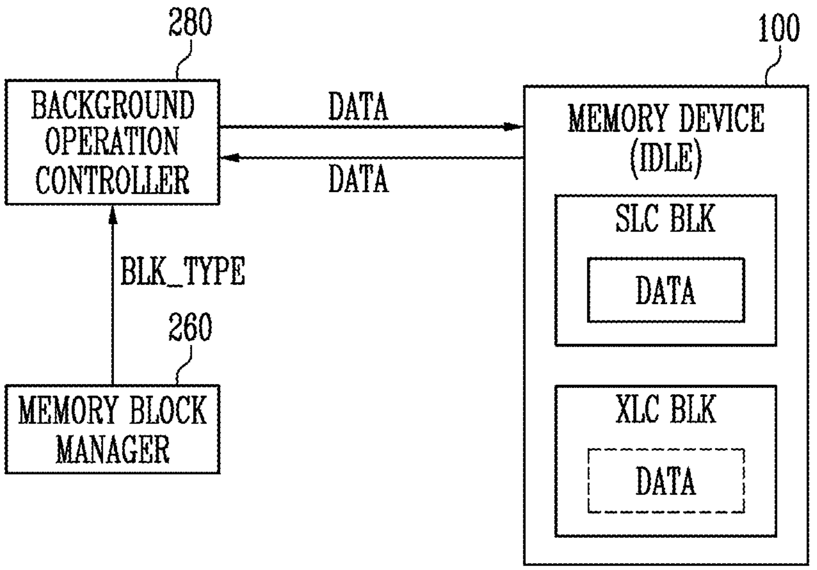
FIG. 5 is a diagram illustrating an example of performing a write operation in response to a garbage collection operation according to an embodiment of the present disclosure.

FIG. 5 is a diagram illustrating an example of performing a write operation in response to a garbage collection operation according to an embodiment of the present disclosure. FIG. 5 illustrates an example of performing a write operation included in a garbage collection operation when a first condition and a second condition are satisfied.

Referring to FIG. 5, the memory controller 200 may control the memory device 100 to store valid data DATA of a victim memory block in a first write mode during the garbage collection operation including the write operation.

For example, when the condition of the garbage collection operation is triggered, the background operation controller 280 may receive the valid data DATA stored in the victim memory block in the memory device 100. Here, although the victim memory block is illustrated as a multi-memory block XLC BLK, the present disclosure is not limited thereto. For example, in an embodiment, the victim memory block may be a single memory block SLC BLK.

Here, because the first and second conditions are satisfied, the memory block manager 260 may select the first write mode, and may provide information about a memory block type BLK_TYPE to be used in the write operation determined based on the first write mode to the background operation controller 280. The information about the memory block type BLK_TYPE may include information indicating a single memory block SLC BLK determined based on the first write mode.

In an embodiment, the background operation controller 280 may provide the memory device 100 with a write command, an address indicating a single memory block SLC BLK in which the valid data DATA is to be stored, and the valid data DATA, based on the information about the memory block type BLK_TYPE. Further, the background operation controller 280 may provide the memory device 100 with a write command, an address indicating a memory block in which valid data DATA is to be stored, a signal for controlling the corresponding memory block to operate as a single memory block SLC BLK, and the valid data DATA, based on the information about the memory block type BLK_TYPE.

The memory device 100 may store the valid data DATA in the single memory block SLC BLK indicated by the address in response to the write command or store one data bit in each of memory cells included in the memory block indicated by the address.

In an embodiment, the background operation controller 280 may control the memory device 100 to perform a write operation included in the garbage collection operation depending on the determined write mode during an idle period. For example, the background operation controller 280 may determine whether a current state is an idle state, and may control the memory device 100 to perform the write operation included in the garbage collection operation based on the first write mode when it is determined that the current state is the idle state. On the other hand, when it is determined that the current state is not an idle state, the background operation controller 280 may wait for the idle state, and thereafter control the memory device 100 to perform the write operation included in the garbage collection operation based on the first write mode when the current state becomes the idle state. In some implementations, when it is determined that the current state is not an idle state and corresponds to a specific situation in which an area for data storage needs to be secured in the memory device 100, the background operation controller 280 may control the memory device 100 to perform the write operation included in the garbage collection operation using a multi-memory block TLC BLK, regardless of the determined write mode.

In an embodiment, the background operation controller 280 may control the memory device 100 to perform the write operation included in the garbage collection operation depending on the determined write mode at a preset time such as dawn, or in the state in which the battery of the host 300 is being charged.

In some implementations, when the memory device enters stable status in which the first condition and the second condition are not satisfied after the write operation is performed depending on the first write mode, the memory controller 200 may perform a data migration operation. The data migration operation may be an operation of controlling the memory device 100 to store data which has been stored in some of a plurality of single memory blocks SLC BLK in a plurality of multi-memory blocks XLC BLK, and will be described in detail below with reference to FIGS. 6 and 7 to be explained below.

Figure 6:
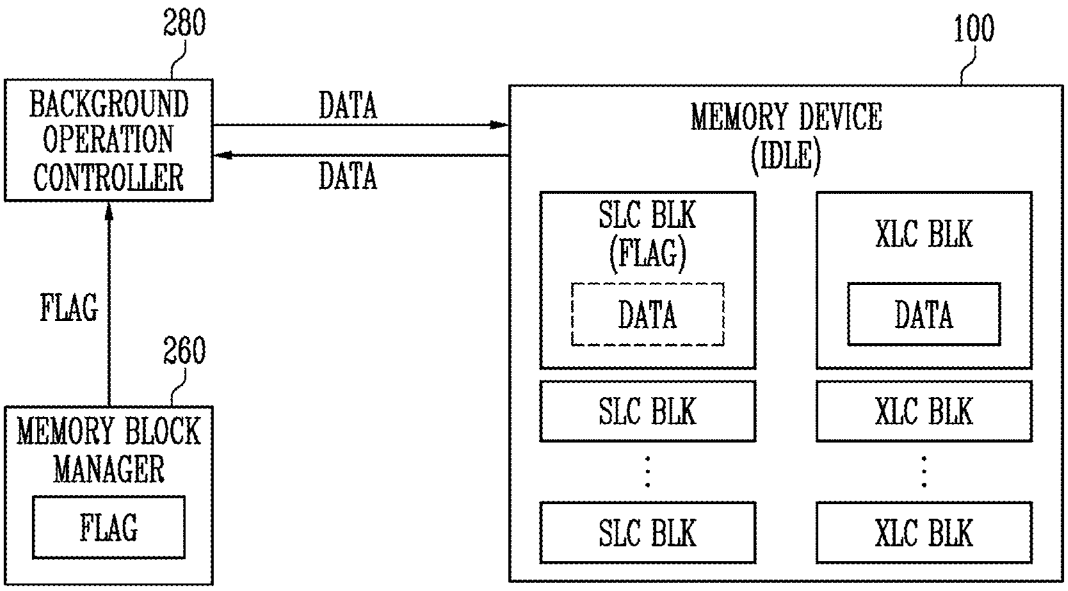
FIG. 6 is a diagram illustrating an example of performing an operation of migrating data according to an embodiment of the present disclosure.

FIG. 6 is a diagram illustrating an example of performing an operation of migrating data according to an embodiment of the present disclosure. FIG. 6 may explain an example of migrating data DATA which has been stored in a single memory block SLC BLK based on the first write mode to a multi-memory block XLC BLK.

In an embodiment, when internal temperature is higher than first reference temperature corresponding to low temperature and lower than second reference temperature corresponding to high temperature, and a performance cycle of a read reclaim operation is equal to or longer than a reference cycle after the write operation is performed depending on the first write mode, the memory controller 200 may control the memory device 100 to migrate data stored in the single memory block SLC BLK in the first write mode to a multi-memory block XLC BLK in a second write mode. In another example, when a change in internal temperature is less than or equal to a reference value during a preset period and the performance cycle of the read reclaim operation is equal to or longer than the reference cycle after the write operation is performed depending on the first write mode, the memory controller 200 may control the memory device 100 to migrate data stored in the single memory block SLC BLK in the first write mode to the multi-memory block XLC BLK in the second write mode.

Referring to FIG. 6, the memory block manager 260 may store a flag FLAG indicating at least one single memory block SLC BLK in which data DATA is stored in the first write mode. For example, the memory block manager 260 may store a super block table in which a super block is to be managed, and may include the flag FLAG in the super block table. The background operation controller 280 may read data DATA stored in the single memory block SLC BLK indicated by the received flag FLAG based on the flag FLAG. Thereafter, the background operation controller 280 may control the memory device 100 to store the read data DATA in such a way to migrate the read data DATA to the multi-memory block XLC BLK or to store a plurality of data bits in memory cells included in the memory block.

In an embodiment, the background operation controller 280 may perform the data migration operation illustrated in FIG. 6 during the idle period.

Figure 7:
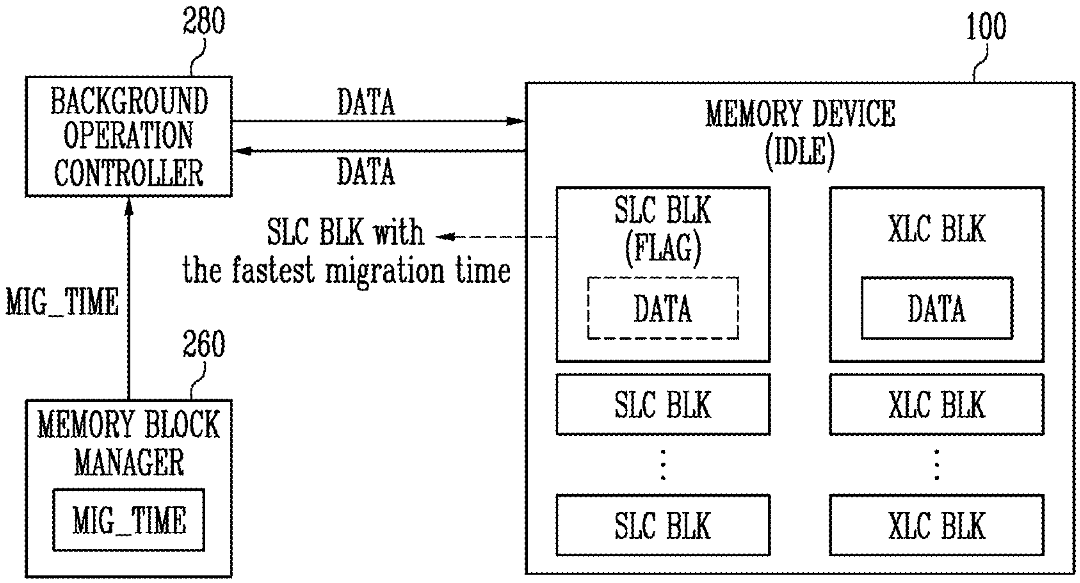
FIG. 7 is a diagram illustrating an example of performing an operation of migrating data according to an embodiment of the present disclosure.

FIG. 7 is a diagram illustrating an example of performing an operation of migrating data according to an embodiment of the present disclosure. FIG. 7 may explain an example of migrating data stored in a single memory block SLC BLK to a multi-memory block XLC BLK. Here, the data stored in the single memory block SLC BLK may include all of data stored based on a first write mode and data stored regardless of the first write mode.

Referring to FIG. 7, the memory block manager 260 may measure a data migration operation performance time MIG_TIME during which data stored in each of the plurality of single memory blocks SLC BLK is stored in another memory block. Here, the respective data migration operation performance times MIG_TIME of the plurality of single memory blocks SLC BLK may be measured by recording the time required for a separate test operation, a normal write operation, a read operation or others.

In an embodiment, the background operation controller 280 may determine a target memory block based on the received data migration operation performance times MIG_TIME of the plurality of single memory blocks SLC BLK.

In an embodiment, the background operation controller 280 may determine the target memory block in the order of shorter data migration operation performance times MIG_TIME among the plurality of single memory blocks SLC BLK. In FIG. 7, although a single memory block SLC BLK having the shortest time required for the data migration operation is determined to be the target memory block, the background operation controller 280 may be configured to, when a plurality of single memory blocks SLC BLK are determined to be target memory blocks, determine a plurality of single memory blocks SLC BLK to be the target memory blocks in the order of shorter data migration operation performance times.

The background operation controller 280 may control the memory device 100 to read the data DATA stored in the determined single memory block SLC BLK and to store the read data DATA in the multi-memory block XLC BLK.

In an embodiment, the background operation controller 280 may perform the data migration operation illustrated in FIG. 7 during the idle period.

Figure 8:
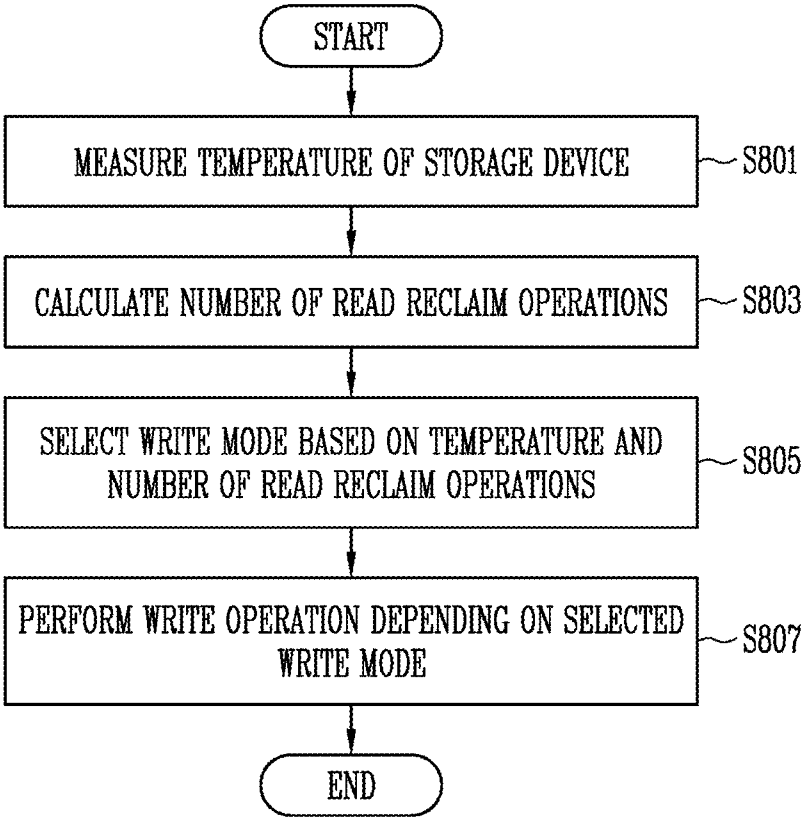
FIG. 8 is a flowchart illustrating a method of operating a storage device according to an embodiment of the present disclosure.

FIG. 8 is a flowchart illustrating a method of operating a storage device according to an embodiment of the present disclosure. The method illustrated in FIG. 8 may be performed by, for example, the storage device 50 illustrated in FIG. 1.

Referring to FIG. 8, at step S801, the storage device 50 may measure the temperature of the storage device 50.

At step S803, the storage device 50 may calculate the number of read reclaim operations.

At step S805, the storage device 50 may select either a first write mode in which one data bit is stored in a memory cell or a second write mode in which a plurality of data bits are stored in the memory cell, based on the temperature and the number of read reclaim operations.

In an embodiment, the storage device 50 may select the write mode depending on whether a first condition based on the temperature and a second condition based on the number of read reclaim operations are satisfied. In an example, the storage device 50 may select the first write mode in response to the case where the first condition and the second condition are satisfied. In an example, the storage device 50 may select the second write mode in response to the case where at least one of the first condition and the second condition is not satisfied.

At step S807, the storage device 50 may perform a write operation depending on the selected write mode. Here, the write operation may include at least one of a write operation corresponding to the request of the host 300 and a write operation included in a background operation.

Figure 9:
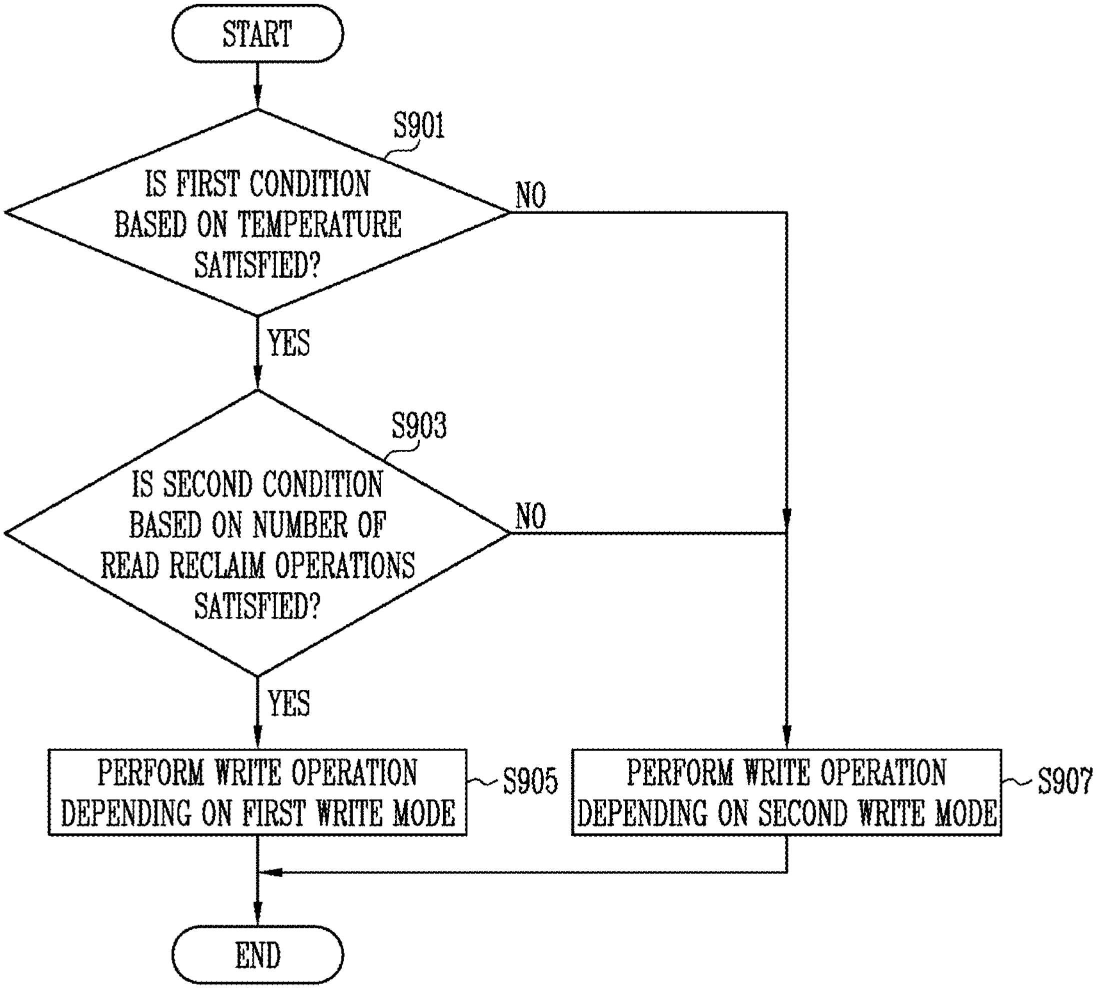
FIG. 9 is a flowchart illustrating a method of performing a write operation according to an embodiment of the present disclosure.

FIG. 9 is a flowchart illustrating a method of performing a write operation according to an embodiment of the present disclosure. The method illustrated in FIG. 9 may be performed by, for example, the storage device 50 illustrated in FIG. 1. FIG. 9 may be a diagram in which steps S805 and S807 of FIG. 8 are embodied.

Referring to FIG. 9, at step S901, the storage device 50 may determine whether the first condition based on the temperature is satisfied. For example, when the temperature falls within a preset temperature range or when a change in temperature is greater than a reference value during a preset period, the storage device 50 may determine that the first condition is satisfied. Here, the preset temperature range may include a range which is lower than first reference temperature corresponding to low temperature or higher than second reference temperature corresponding to high temperature.

Based on the result of determination at step S901, when the first condition is satisfied, the storage device 50 may perform step S903.

At step S903, the storage device 50 may determine whether the second condition based on the number of read reclaim operations is satisfied. For example, when a performance cycle of a read reclaim operation based on the number of read reclaim operations is shorter than a reference cycle, the storage device 50 may determine that the second condition is satisfied.

Based on the result of determination at step S903, when the second condition is satisfied, the storage device 50 may perform step S905.

At step S905, the storage device 50 may perform a write operation depending on the first write mode.

When the first condition or the second condition is not satisfied based on the results of determination at steps S901 and S903, the storage device 50 may perform step S907. For example, when the temperature falls out of the preset temperature range when the change in temperature is less than or equal to the reference value during a preset period, the storage device 50 may determine that the first condition is not satisfied. When the performance cycle of the read reclaim operation is equal to or longer than the reference cycle, the storage device 50 may determine that the second condition is not satisfied. In this case, the storage device 50 may select the second write mode in response to the case where at least one of the first condition and the second condition is not satisfied.

At step S907, the storage device 50 may perform a write operation depending on the second write mode.

Figure 10:
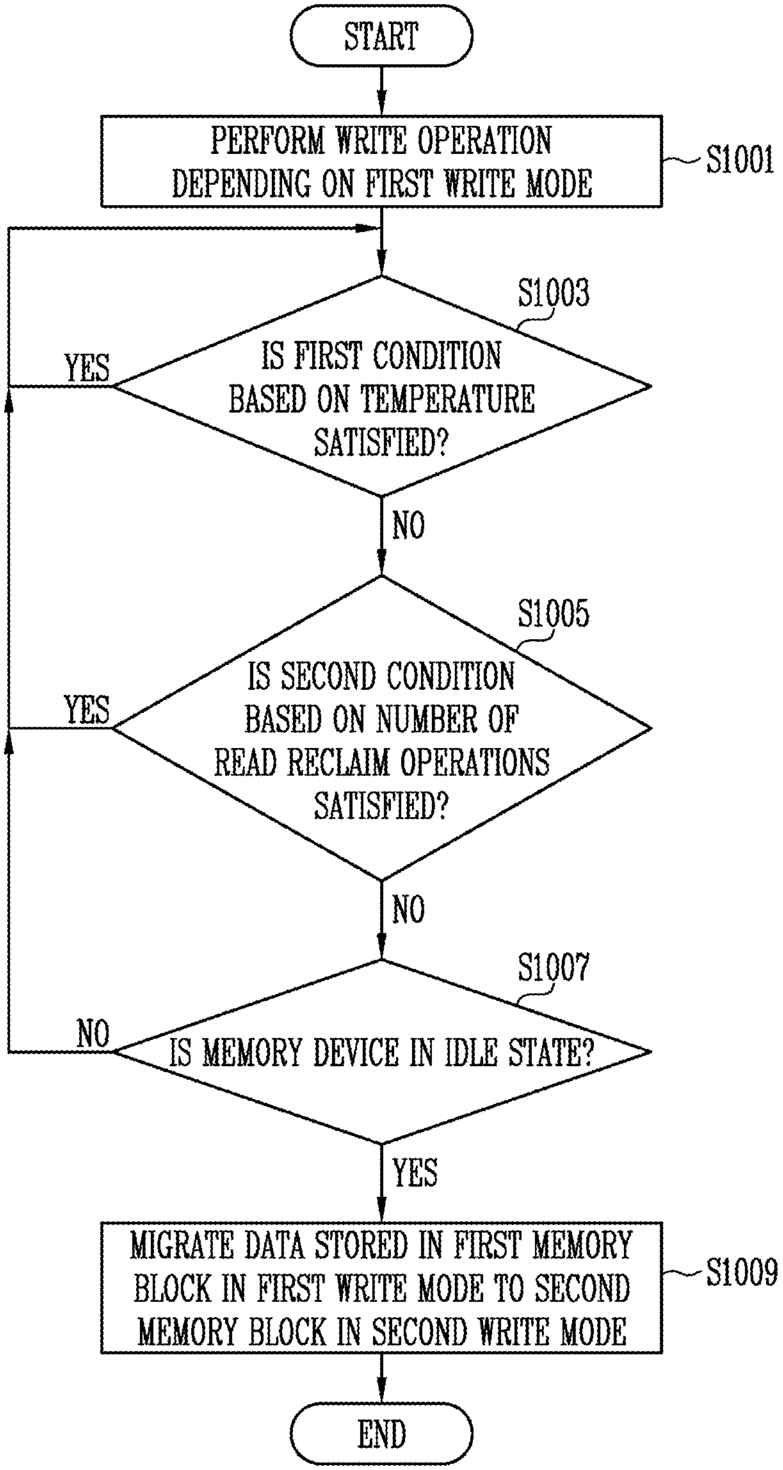
FIG. 10 is a flowchart illustrating a method of performing an operation of migrating data according to an embodiment of the present disclosure.

FIG. 10 is a flowchart illustrating a method of performing an operation of migrating data according to an embodiment of the present disclosure. The method illustrated in FIG. 10 may be performed by, for example, the storage device 50 illustrated in FIG. 1. FIG. 10 is a diagram for explaining a method performed after step S807 of FIG. 8, and step S1001 may indicate step S807 of FIG. 8.

Referring to FIG. 10, the storage device 50 may perform a write operation depending on the first write mode at step S1001.

At step S1003, the storage device 50 may determine whether the first condition based on the temperature is satisfied. For example, when the temperature falls out of the preset temperature range when the change in temperature is less than or equal to the reference value during a preset period, the storage device 50 may determine that the first condition is not satisfied. Based on the result of determination at step S1003, when the first condition is not satisfied, the storage device 50 may perform step S1005.

At step S1005 the storage device 50 may determine whether the second condition based on the number of error bits is satisfied. For example, when the performance cycle of the read reclaim operation is equal to or longer than the reference cycle, the storage device 50 may determine that the second condition is not satisfied. Based on the result of determination at step S1005, when the second condition is not satisfied, the storage device 50 may perform step S1007.

In an embodiment, the storage device 50 may migrate data stored in the first memory block in the first write mode to a second memory block in the second write mode in response to the case where the first condition and the second condition are not satisfied.

For example, at step S1007, the storage device 50 may determine whether a current state is an idle state. Based on the result of determination at step S1007, when the current state is the idle state, the storage device 50 may perform step S1009.

At step S1009, the storage device 50 may migrate the data stored in the first memory block to the second memory block in response to the case where the current state is the idle state.

On the other hand, when the first condition or the second condition is satisfied based on the results of determination at steps S1003 and S1005, or when the current state is not an idle state based on the result of determination at step S1007, the storage device 50 may perform step S1003 by returning to step S1003.

According to the present disclosure, there are provided a storage device having improved reliability and a method of operating the storage device.

What is claimed is:

1. A storage device, comprising:

a memory device including a plurality of memory blocks, each including a plurality of memory cells configured to store data; and a memory controller in communication with the memory device and configured to 1) determine a write mode of a memory block of the memory device to be either a first write mode in which one data bit is stored in a memory cell of a memory block or a second write mode in which a plurality of data bits is stored in a memory cell based on whether a first condition based on a temperature of the storage device is satisfied and whether a second condition based on a number of read reclaim operations that have been performed in the memory block is satisfied, and 2) control the memory device to perform a write operation in the determined write mode, wherein the memory controller is further configured to perform a read reclaim operation in response to a number of error bits in data read from the memory device being greater than or equal to a predetermined number and count the number of the read reclaim operations, wherein the memory controller is configured to control the memory device to perform the write operation based on the first write mode in response to satisfying the first condition that a change in the temperature is greater than a reference value during a preset period and the second condition that a performance cycle of a read reclaim operation based on the number of read reclaim operations is shorter than a reference cycle.

2. A storage device, comprising:

a memory device including a plurality of memory blocks, each including a plurality of memory cells configured to store data; and a memory controller in communication with the memory device and configured to 1) determine a write mode of a memory block of the memory device to be either a first write mode in which one data bit is stored in a memory cell of a memory block or a second write mode in which a plurality of data bits is stored in a memory cell based on a temperature of the storage device and a number of read reclaim operations that have been performed in the memory block and 2) control the memory device to perform a write operation in the determined write mode, wherein the memory controller is configured to control the memory device to perform the write operation based on the first write mode in response to satisfying a first condition that the temperature is lower than first reference temperature corresponding to lower temperature or higher than second reference temperature corresponding to high temperature and a second condition that a performance cycle of the read reclaim operations based on the number of read reclaim operations is shorter than a reference cycle.

3. The storage device according to claim 2, wherein the memory controller is configured to control the memory device to perform the write operation based on the second write mode in response to the temperature being higher than first reference temperature corresponding to low temperature and lower than second reference temperature corresponding to high temperature.

4. The storage device according to claim 1, wherein the memory controller is configured to control the memory device to perform the write operation based on the second write mode in response to a change of the temperature during a preset time being less than or equal to a reference value.

5. The storage device according to claim 1, wherein the memory controller is configured to control the memory device to perform the write operation based on the second write mode in response to a performance cycle of the read reclaim operations that is obtained based on the number of read reclaim operations is equal to or longer than a reference cycle.

6. The storage device according to claim 1, wherein the memory controller is configured to control the memory device to store data corresponding to the write operation based on the write mode in response to receiving a request for the write operation from a host or during a garbage collection operation including the write operation.

7. The storage device according to claim 1, wherein the memory controller is configured to control the memory device to perform the write operation based on the write mode during an idle period in which a request for any operation is not received from a host or a background operation is not triggered.

8. The storage device according to claim 2, wherein the memory controller is configured to control the memory device to migrate data stored in a first memory block in the first write mode among the plurality of memory blocks to a second memory block in the second write mode in response to satisfying the first condition that the temperature is higher than first reference temperature corresponding to low temperature and lower than second reference temperature corresponding to high temperature and the second condition that a performance cycle of the read reclaim operations based on the number of read reclaim operations is equal to or longer than a reference cycle after the write operation is performed depending on the first write mode.

9. The storage device according to claim 8, wherein the memory controller is configured to control the memory device to store a flag indicating the first memory block and migrate data stored in the first memory block to the second memory block based on the flag.

10. The storage device according to claim 8, wherein the memory controller is configured to determine a target memory block among a plurality of first memory blocks, target memory block storing data to be migrated to the second memory block, based on data migration operation performance times of the plurality of first memory blocks.

11. The storage device according to claim 10, wherein the memory controller is configured to determine the target memory block having data migration operation performance time that is shorter as compared to data migration operation performance times of other first memory blocks.

12. The storage device according to claim 8, wherein the memory controller is configured to control the memory device to migrate the data stored in the first memory block to the second memory block during an idle time in which a request for any operation is not received from a host or a background operation is not triggered.

13. The storage device according to claim 1, wherein the memory controller is configured, after the write operation for the memory block is performed based on the first write mode, to control the memory device to migrate data stored in the memory block in the first write mode to another memory block in a second write mode in response to satisfying the first condition that a change in the temperature is less than or equal to a reference value during a preset period and the second condition that a performance cycle of the read reclaim operations obtained based on the number of read reclaim operations is equal to or longer than a reference cycle.

14. A method of operating a storage device, comprising:

measuring a temperature of the storage device including a memory device and a memory controller, wherein the memory device includes a plurality of memory blocks, each including a plurality of memory cells configured to store data, and the memory controller is in communication with the memory device and configured to control the memory device;

performing a read reclaim operation in response to a number of error bits in data read from the memory device being greater than or equal to a predetermined number;

calculating a number of read reclaim operations;

selecting a write mode of a memory block to be either a first write mode in which one data bit is stored in a memory cell of the memory block or a second write mode in which a plurality of data bits is stored in the memory cell based on whether a first condition based on the temperature is satisfied and whether a second condition based on the number of read reclaim operations is satisfied; and performing a write operation in the selected write mode, wherein selecting of the write mode comprises:

selecting the first write mode in response to satisfying the first condition that the temperature falls within a preset temperature range or that a change in the temperature is greater than a reference value during a preset period and the second condition that a performance cycle of the read reclaim operations obtained based on the number of read reclaim operations is shorter than a reference cycle.

15. The method according to claim 14, further comprising, after performing of the write operation:

migrating data stored in a first memory block in the first write mode among the plurality of memory blocks to a second memory block in the second write mode in response to satisfying the first condition that the temperature falls out of the preset temperature range and the change in the temperature is less than or equal to the reference value during a preset period and the second condition that the performance cycle of the read reclaim operation is equal to or longer than the reference cycle.

16. The method according to claim 15, wherein the migrating of the data comprises:

determining whether a current state is an idle state in which a request for any operation is not received from a host or a background operation is not triggered; and migrating the data stored in the first memory block to the second memory block in response to the current state being the idle state.

17. The method according to claim 14, wherein the selecting one of the write mode further comprises:

selecting the second write mode in response to satisfying the first condition that the temperature falls out of a preset temperature range and a change in the temperature is less than or equal to a reference value during a preset period or the second condition that a performance cycle of the read reclaim operation is equal to or longer than the reference cycle.

* * * * *